Oct. 11, 1955  M. KRAUT  2,720,580
ELECTRIC HEAT RADIATOR
Filed April 16, 1953
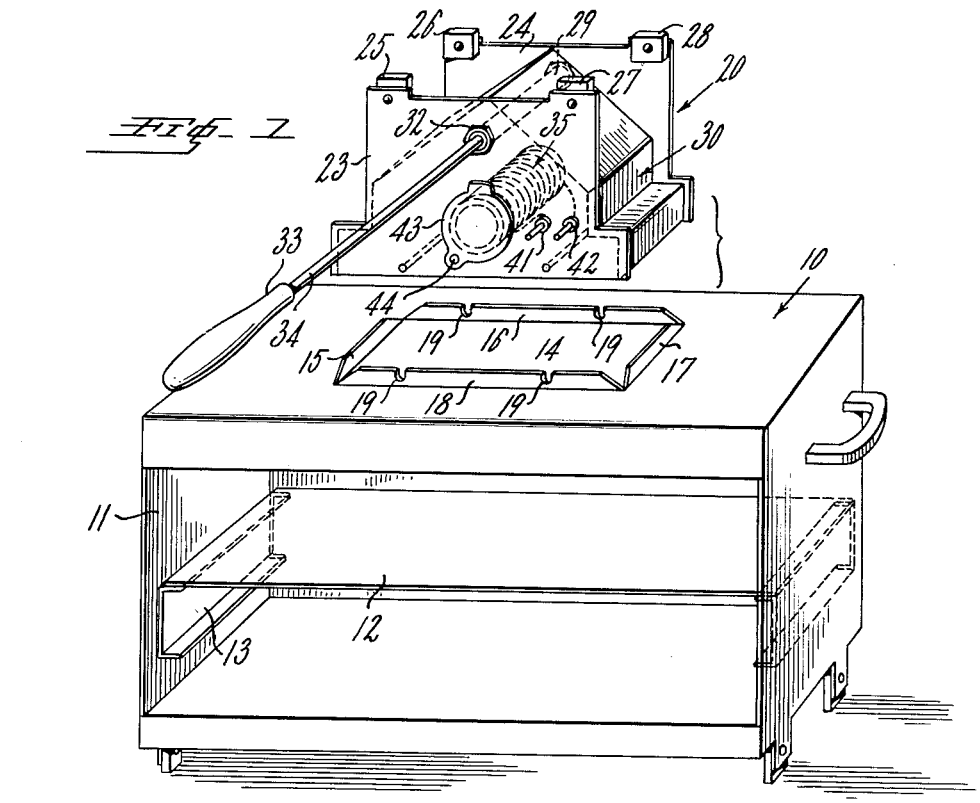
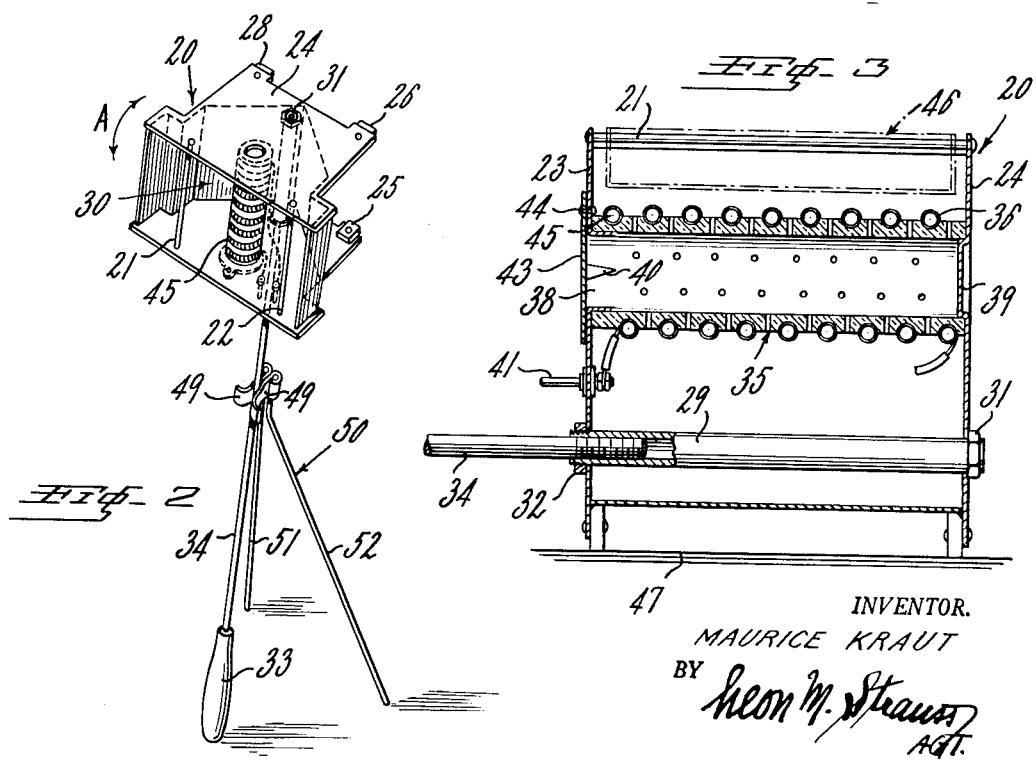
INVENTOR.
MAURICE KRAUT
BY Leon M. Strauss
AGT.

United States Patent Office 2,720,580
Patented Oct. 11, 1955

2,720,580

ELECTRIC HEAT RADIATOR

Maurice Kraut, Brooklyn, N. Y.

Application April 16, 1953, Serial No. 349,130

3 Claims. (Cl. 219—34)

This invention relates to heating or ray-emitting apparatus of the type in which a wire coil may be included in an electric circuit to become incandescent for the purpose of radiation, in particular, heat or infra-red radiation.

It is one of the objects of the present invention to provide means facilitating the accommodation of heating or ray-emitting means within an apparatus housing which may be used for various purposes, such as a support for cooking utensils, for a reflector holder, and the like.

It is another object of the present invention to provide means affording the arrangement of said wire coil relative to a reflector surface forming part of said housing and further the location of said coil on a hollow carrier within the housing, whereby heating of an object within the hollow carrier may be achieved while rays are simultaneously transmitted by the reflector surface.

Still a further object of the present invention resides in the provision of means permitting the combination of the heating apparatus with an oven-forming receptacle and for ready removal from the latter.

Still a further object of the present invention is to provide means ensuring air circulation through the hollow carrier to thereby bring about greater intensity of the heating effect.

Yet a further object of the present invention resides in the provision of means permitting the disposition of the heating apparatus in various angular positions with respect to the surface on which the apparatus is supported.

The above and other objects and features will become apparent from the following detailed description, reference being had to the accompanying drawing, in which:

Fig. 1 shows an exploded view of an oven receptacle and of the heating apparatus made in accordance with the present invention;

Fig. 2 shows the heating apparatus of Fig. 1 functioning as an electric heating radiator; and Fig. 3 is an enlarged sectional view through the center of the heating apparatus shown in Fig. 2.

Referring now more particularly to the drawing, there is shown an oven receptacle 10 having a front opening 11 and a support 13 for a shelf 12. The receptacle 10 is provided with an upper opening 14 defined by upright wall portions 15, 16, 17 and 18 for the engagement with the heating apparatus 20. Walls 16 and 18 are provided with grooves 19 for the insertion therein of struts 21, 22 forming parts of the housing of the apparatus 20. The housing 20 generally comprises two walls 23, 24 terminating in feet 25, 26, 27 and 28 and a specially shaped reflector surface 30 extending intermediate and in contact with the walls 23, 24.

Further extending intermediate walls 23, 24 is a hollow or tubular carrier 35 made from insulating material. Walls 23, 24 are further interconnected by means of a tubular body 29 secured to wall 24 by means of a nut 31. Into the end 32 of tube member 29 is threadedly engaged a handle 33 having the rod extension 34.

Carrier 35 supports an electric heating coil 36 of any suitable type. Carrier 35 is further provided with a plurality of openings 37 permitting air circulation from within the interior 38 of the hollow carrier 35 therewithout. According to Fig. 3 hollow carrier 35 is supported at one end on a projection 39 forming part of wall 24 and on the opposite end on lugs 40 forming parts of wall 23.

As can be further seen from Figs. 1 and 3, carrier 35 of insulating material carries the heating coil 45 which terminates in respective posts 41 and 42 mounted on the upright wall 23.

As it is further seen from Fig. 3, there is swingably mounted on upright wall 23 a disc-shaped door 43 which is rotatable about a pivot 44 to either permit access to the interior of the hollow carrier 35 or to close the opening of the same, as desired. If door 43 is opened, then a curling iron or the like may be inserted in the interior of carrier 35, whereby through radiation and air circulation heat will be transferred to such object placed in the interior 38 of carrier 35. Simultaneously, the container 46, indicated in dotted lines, may be suspended from struts 21 and 22 and may be used for cooking or similar purposes. Handle 33 and rod 34 connected therewith may be employed to transfer the heating device to any desired location of a suitable base 47.

If it is desired to employ the heating device 20 in any other manner and at any desired angle with respect to the base 47, a bipod holder 50 may be employed which is clamped on rod 34 by means of two spring arms 48 and 49. Holder 50 has legs 51 and 52 whereby the heating device 20 may be held in position relative to the base. Handle 33 may be further used to rotate the electric heat radiator in the direction of arrows A in order to concentrate the emission of heat.

From the above disclosure it will be readily gathered that the electric heat radiator apparatus made in accordance with the present invention may be either used directly as a support for a utensil or like appliance to be heated or may serve as a complementary heating unit for engagement with the walls of the opening of an oven-shaped receptacle and for removal therefrom.

The apparatus may be constructed as to be readily disassembled, as it is evidenced from the mounting of the carrier for the heating coil and of the handle and rod with respect to the housing formed by the upright walls and intermediate arcuately or angularly-shaped wall, which may have a highly polished inner surface serving as a reflector.

It can thus be seen that there has been provided according to the invention an electric heat radiator apparatus comprising two spaced apart upright walls, a hollow carrier of insulating material extending intermediate said walls and connected with the same, heating coil means supported by said hollow carrier and disposed for connection with an electrical circuit, an intermediate wall extending below said carrier at a predetermined distance therefrom and terminating in respective ends, means attaching said ends of said intermediate wall to said upright walls, said attaching means including means interconnecting said upright walls between the ends of said intermediate wall, to thereby provide a platform for a utensil, and rod means including a handle and connected to said upright walls for manipulating said upright walls, said intermediate wall and said hollow carrier with said coil means relative to a support.

Although specific embodiments of the invention have been described and shown in the drawing, it should be noted that the invention may be realized in modified form and adaptations of the arrangements herein disclosed may be made, as may readily occur to persons skilled in the art without constituting a departure from

Having thus described the invention, what is claimed as new and desired to be secured by Letters Patent is:

1. An electric heating apparatus comprising a housing having an open end, said housing being formed of two spaced upright walls and an intermediate wall extending between and connected to said upright walls, means interconnecting said upright walls adjacent said open end of said housing to thereby provide a platform for a utensil, a hollow carrier of insulating material extending between said upright walls within said housing and connected with the same, at least one of said upright walls being provided with an opening communicating with the interior of said hollow carrier, door means pivotally mounted on said one upright wall for sealing off said opening, said hollow carrier being provided with perforations, heating coil means supported by said hollow carrier and disposed for connection with an electrical circuit, and rod means including a handle and connected to at least one of said walls for manipulating said housing, whereby air flows between said hollow carrier and said housing past said coil means and through said perforations, the direction of flow being determined by the position of said door means.

2. An apparatus according to claim 1, wherein said intermediate wall is angularly shaped in cross section and is provided with an inner surface forming a reflector surface.

3. An apparatus according to claim 1, including bipod means attachable to said rod means for maintaining said apparatus in predetermined position relative to a support on which said handle and rod means and said attachable bipod means rest.

References Cited in the file of this patent

UNITED STATES PATENTS

| | | |
|---|---|---|
| 775,714 | Weggen | Nov. 22, 1904 |
| 1,147,951 | Kitchen | July 27, 1915 |
| 1,534,682 | Carmean | Apr. 21, 1925 |
| 1,617,923 | O'Neill | Feb. 15, 1927 |
| 2,091,746 | Wiley | Aug. 31, 1937 |

FOREIGN PATENTS

| | | |
|---|---|---|
| 75,025 | Switzerland | Oct. 16, 1917 |
| 290,582 | Great Britain | 1929 |